P. W. MACKENZIE & C. W. ISBELL.
Apparatus for Deodorizing and Reviving, Purifying Materials of Gas-Works.
No. 152,853. Patented July 7, 1874.
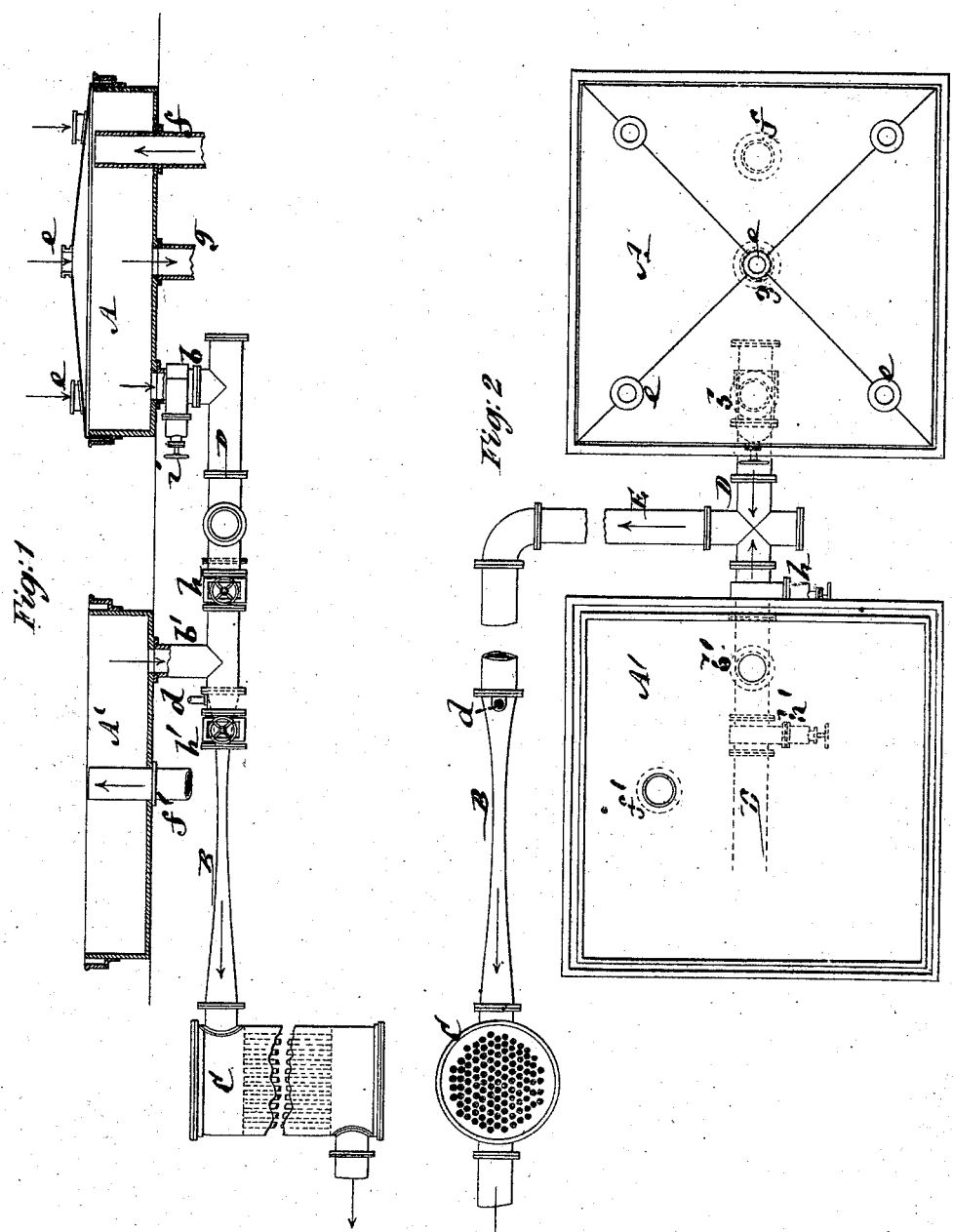

UNITED STATES PATENT OFFICE.

PHILIP W. MACKENZIE, OF BLAUVELTVILLE, AND CHARLES W. ISBELL, OF NEW YORK, N. Y.

IMPROVEMENT IN APPARATUS FOR DEODORIZING AND REVIVING PURIFYING MATERIALS OF GAS-WORKS.

Specification forming part of Letters Patent No. 152,853, dated July 7, 1874; application filed April 6, 1874.

*To all whom it may concern:*

Be it known that we, PHILIP W. MACKENZIE, of Blauveltville, in the county of Rockland and State of New York, and CHARLES W. ISBELL, of the city, county, and State of New York, have invented an Improved Apparatus for Deodorizing and Reviving Purifying Materials used in the Purifying-Boxes of Gas-Works, of which the following is a specification:

This invention relates to a process of deodorizing and reviving the purifying materials used in the purifying-boxes of gas-works, for which application for patent has been made by us, and in which steam is introduced into the exhaust or outlet pipe of the purifier for the purpose, by the condensation of said steam, of absorbing or taking up the gas or vapors coming from the purifier or purifiers; also, in which air is drawn through the purifier by a steam-jet exhauster, so that the currents of air brought through the purifier are mingled with the steam from the exhauster, and the gas or vapors with which the air is charged are absorbed or taken up by the water of condensation resulting from the steam.

Figure 1 represents a partly-sectional elevation of our improved apparatus in connection with the purifying-boxes, and Fig. 2 a plan of the same.

A A' are purifying-boxes containing the foul lime or oxide of iron to be purified. Connected with the exhausts or outlets $b$ $b'$ is a steam-jet exhauster, B, of any suitable construction, and communicating with a condenser, C. Said exhauster has its inlet at $d$. The purifying-box A is of the old or ordinary construction, $e$ $e$ being the air-inlets; $f$, the gas-inlet, and $g$ the gas-outlet. The other purifying-box, A', which should be fitted with a cover having air-inlets, as in the case of the other box, which boxes are only two of a series, is represented as of special construction, $f'$ being the gas-inlet from the works, and $b'$ serving not only as the air-outlet when deodorizing, but also as the gas-outlet when not deodorizing and passing the gas to the holder. Valves $h$, $h'$, and $i$ are provided to control the proper action of the apparatus. Thus the valve $i$ serves exclusively to open the air-outlet $b$ from the box A when deodorizing, said outlet communicating, by a pipe, D, with the exhauster B, by a branch, E. The pipe D is the gas-outlet to the holder, and the valves $h$ $h'$ serve, accordingly as they are respectively opened or closed, and accordingly as it is required to deodorize or not, to pass the air in deodorizing, through the valve $h$, to the exhauster B, or, by closing said valve and opening the valve $h'$, passing the gas as it is delivered from the purifying-boxes to the gas-holder by the pipe D.

By this arrangement it will be seen that the same outlet, $b'$, serves either as the gas-outlet when not deodorizing, or as the air-outlet when deodorizing.

By drawing the air through the purifiers by a steam-jet exhauster, which causes the currents of air brought through the purifiers to be intimately mingled with the steam from the exhauster, the gas or vapors contained in said air are absorbed by the water of condensation from the steam-jet, which water of condensation may escape from the condenser C into a sewer, or be collected and treated for the recovery of the ammonia, as desired.

The several arrows indicate the direction of the respective currents of air, gases, or vapors.

We claim—

The combination of the steam-jet exhauster B with any number of purifying-boxes, A', the branch E, the outlet D to the holder, the outlet $b'$ from the box, and the valves $h$ $h'$, essentially as shown and described, and whereby the same outlet, $b'$, serves either as the air or gas outlet when deodorizing or passing gas to the holder.

P. W. MACKENZIE.
CHAS. W. ISBELL.

Witnesses:
M. RYAN,
FRED. HAYNES.